United States Patent [19]

Moriyama

[11] Patent Number: 4,764,020
[45] Date of Patent: Aug. 16, 1988

[54] APPARATUS FOR MIXING AND EXTRUDING VISCOUS LIQUIDS

[76] Inventor: Masao Moriyama, No. 508-13, Tendocho 17, Nishinomiya, Hyogo 663, Japan

[21] Appl. No.: 940,952

[22] Filed: Dec. 12, 1986

[51] Int. Cl.⁴ .......................... B01F 7/08; B29B 1/10; B29C 31/04

[52] U.S. Cl. ....................................... 366/76; 366/85; 366/300; 366/301; 425/131.1; 425/376.1

[58] Field of Search ....................... 366/76, 79, 83, 84, 366/85, 88, 89, 300, 301, 323; 425/204, 205, 208, 209, 131.1–133.5, 376 R–382.2

[56] References Cited

U.S. PATENT DOCUMENTS

| | | | |
|---|---|---|---|
| 3,605,188 | 9/1971 | McCormick et al. | 425/376 X |
| 3,734,472 | 5/1973 | Strohmeier | 366/83 X |
| 3,782,700 | 1/1974 | Wittrock | 366/83 X |
| 3,804,382 | 4/1974 | Pultz | 366/79 X |
| 4,047,705 | 9/1977 | Hanslik | 366/85 |
| 4,213,709 | 7/1980 | Valsamis | 425/209 |
| 4,408,888 | 10/1983 | Hanslik | 366/88 X |
| 4,448,737 | 5/1984 | Johnson | 425/205 X |

FOREIGN PATENT DOCUMENTS 194507 12/1985 Japan .

Primary Examiner—David Werner
Attorney, Agent, or Firm—Koda and Androlia

[57] ABSTRACT

A viscous liquids feeder for an extruding machine including a first container having a pair of cone-shaped rotors and a second container having a screw, the first container being jointed to the second container at a given angle so that the mass of viscous materials in the first container can be extruded into the second container in which the material is fed by the screw toward the mold provided at the head of the second container.

3 Claims, 5 Drawing Sheets

APPARATUS FOR MIXING AND EXTRUDING VISCOUS LIQUIDS

BACKGROUND OF THE INVENTION

1. Field of the Invention

The present invention relates to viscous liquids feeder for an extruding machine wherein the viscous liquids are those obtained by kneading plastic or rubber, into a mold.

2. Description of the Prior Art

In the conventional types of extruding machines the raw material take the form of pellets, which allows the intake port to be small. This type of extruding machine is suitable when the volume of material to be extruded is relatively small, but is not applicable when a large mass is supplied after it is mixed by a large-scale kneading machine. In such cases the mass of material, such as rubber, supplied by the kneader must be reduced to such sizes which are allowed to enter the intake port of the extruding machine. In the case of a screw-type of extruding machine too large volume is nevertheless difficult to reach the screw even if it is allowed to enter the machine through a specially designed large supply port. To facilities the advance of the material to the screw the common practice is to use a pair of pushes which are alternately moved so as to push the material into the screw section. The provision of two pushers requires a space in the machine, thereby resulting in a complicated structure.

OBJECTS AND SUMMARY OF THE INVENTION

The present invention aims at solving the problems pointed out above, and has for its object to provide an improved viscous liquid feeder for an extruding machine, thereby effecting an automatic continuous molding operation.

Another object of the present invention is to provide an improved feeder for an extruding machine of simple construction.

Other objects and advantages of the present invention will become apparent from the detailed description given hereinafter; it should be understood, however, that the detailed description and specific embodiment are given by way of illustration only, since various changes and modifications within the spirits and scope of the invention will become apparent to those skilled in the art from this detailed description and drawings.

According to the present invention there is provided viscous liquids feeder for an extruding machine, the feeder comprising:

a first container including a pair of first rotors housed axially thereof, each of the rotors being shaped like a cone, having spiral blades on its peripheral surface, the rotors rotating in different directions, the first container including a material intake section in its upstream portion;

a second container having a screw rotatively housed therein, the second container being provided horizontally with respect to the first container;

a junction section provided in the second container at which the first container is jointed thereto in such a manner that the interior of the first container communicates with that of the second container so as to allow the mixed material therein to transfer from the first container to the second container;

wherein the axes of the pair of rotors form a given angle against the horizontal plane; and wherein the material intake section includes a port having a cross-sectional area of being at least seven times as large as that of the second container.

DETAILED DESCRIPTION OF THE PREFERRED EMBODYMENT

Figure 1:
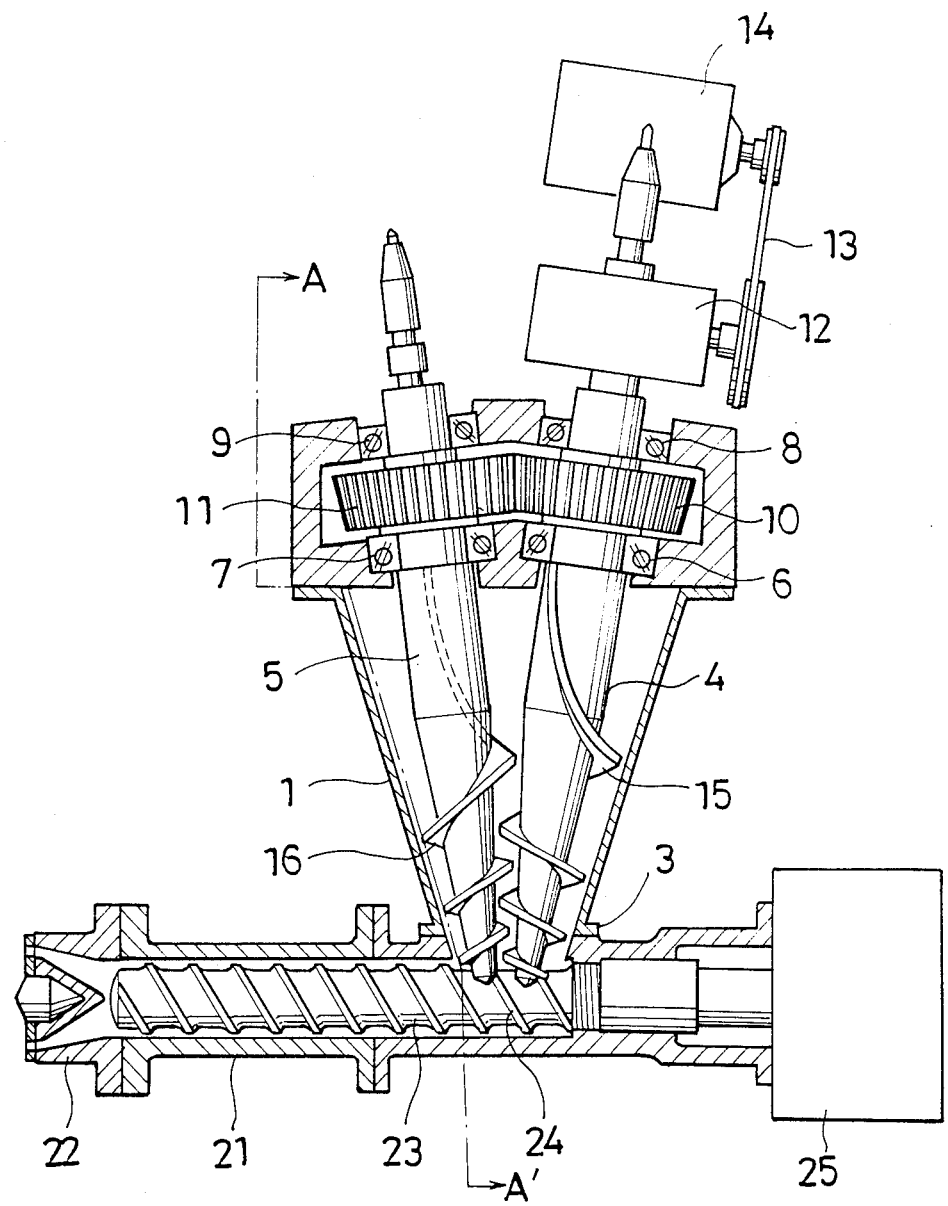
FIG. 1 is a cross-sectional plan view, partly broken, showing an apparatus embodying the present invention.
Figure 2:
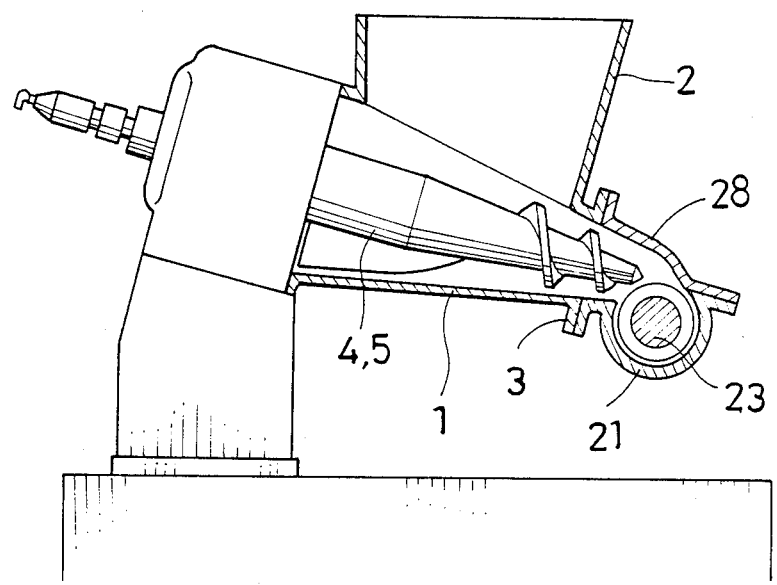
FIG. 2 is a cross-sectional side view taken along the line A—A' in FIG. 1.

The feeder of the invention which includes a container 1 having an intake port 2 opened upwardly, and a flange 3 in its head portion, wherein, as clerly shown in FIG. 2, the container 1 takes a conical form rising toward the base portion (in FIG. 2, the lefthand portion). The angle of decline is appropriately determined as mentioned below.

The container 1 contains a pair of rotors 4 and 5 supported by bearings 6, 7, 8 and 9, and the rotors have their own bevel gears 10 and 11 which are in mesh. The rotor 4 or 5 is rotated by means of a motor 14 through a speed reduction device 12 and a driving belt 13. Each rotor 4, 5 has spiral blades 15, 16 respectively, which have progressively acute angles toward their terminating ends, so as to enable the blades to sink deeply into the viscous liquid in the container 1. The blades located immediately under the intake port 2 erect at right angle to the axis of the rotor.

Figure 3:
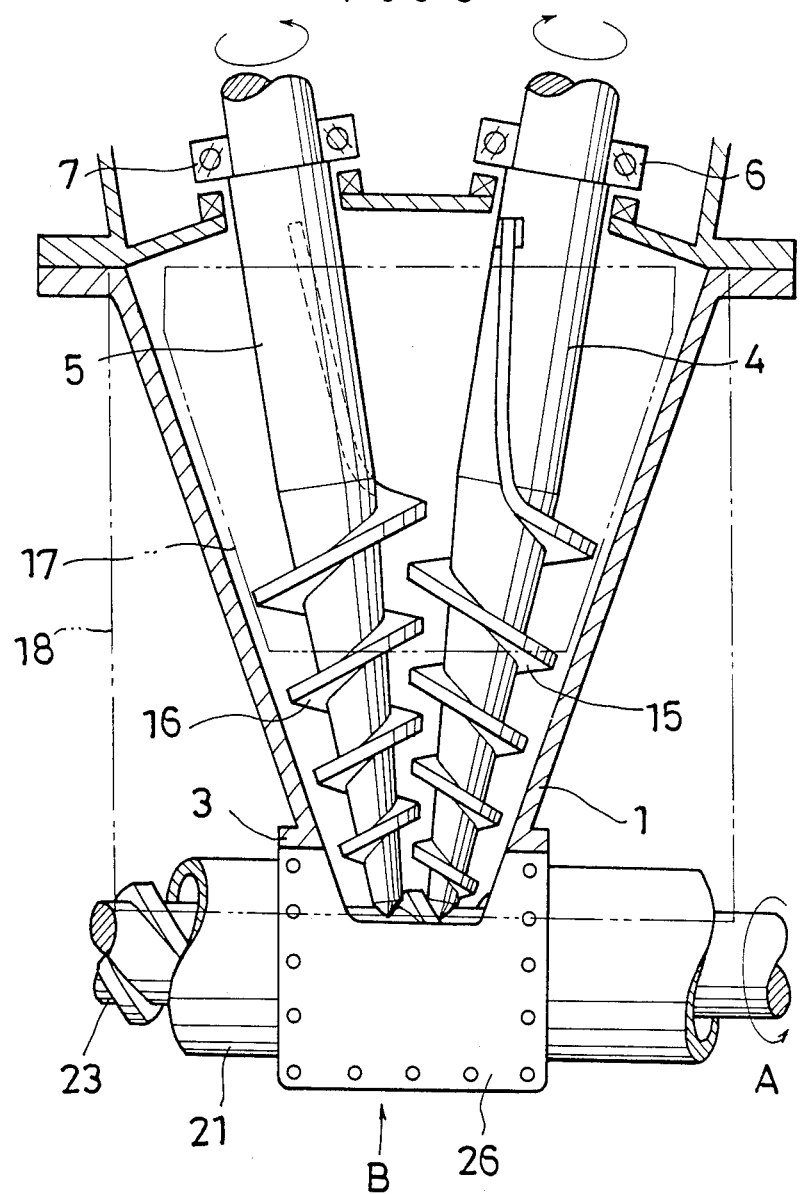
FIG. 3 is a cross-sectional fragmentary view showing the screw section shown in FIG. 1.

As shown in FIG. 2 the intake port 2 is widely opened. In FIG. 3 the phantom lines 17 and 18 denote a lower open end and an upper open end of the intake port 2, respectively.

In addition to the container 1, there is provided a cylindrical container 21 which includes a mold 22 provided at its end portion, and which houses a screw 23 having threads 24. The screw 23 is rotated by a motor (not shown) through a speed reduction device 25.

Figure 4:
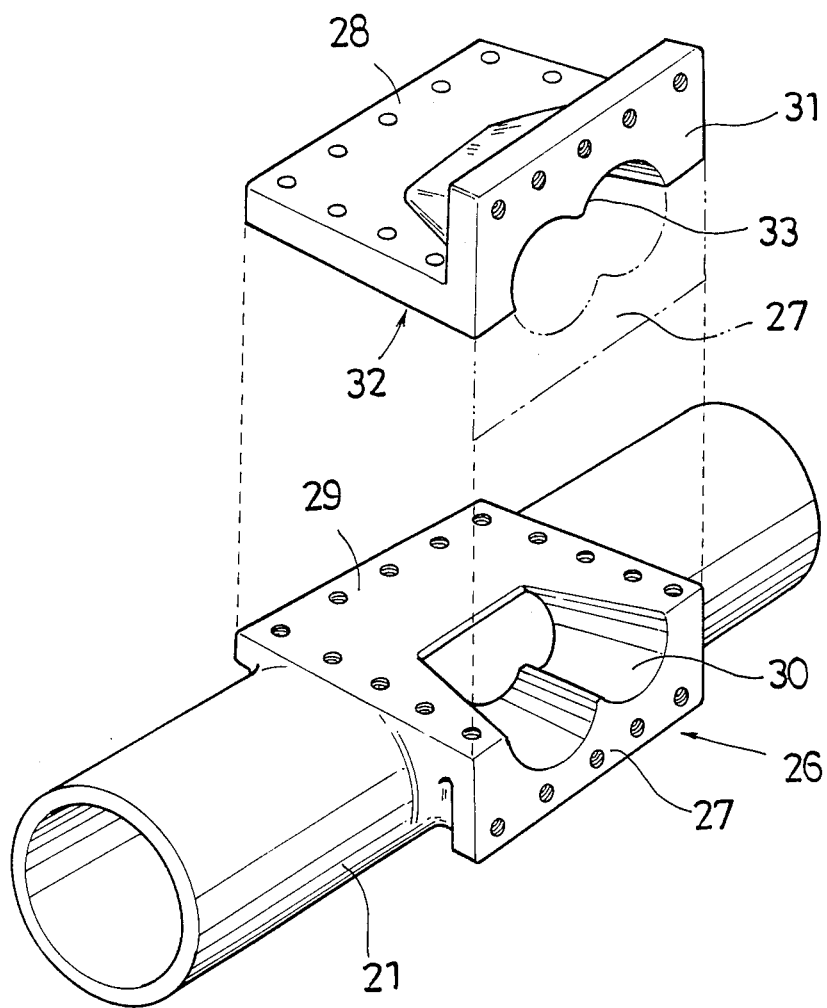
FIG. 4 is a perspective analytical view showing the joint (B) in FIG. 3.
Figure 5:
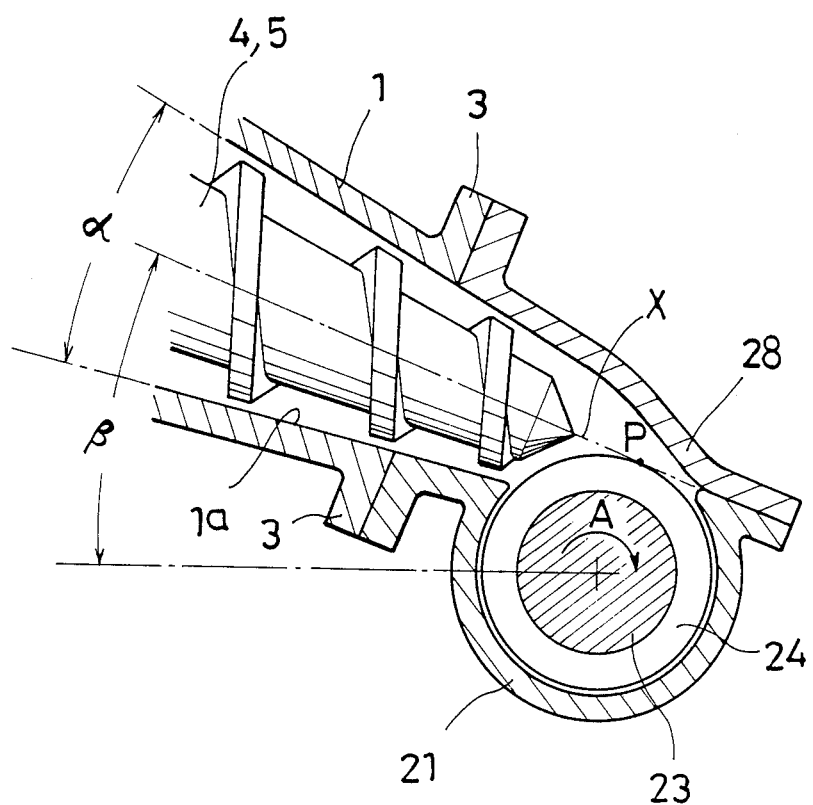
FIG. 5 is a cross-sectional schematic side view showing a relationship between the shaft of the cone-shaped rotor and that of the screw.

In this way the feeder of the invention includes the rotors 4, 5 and the screw 23. Referring to FIGS. 4 and 5 the joint between the rotors 4, 5 and the screw 23 will be described:

The cylindrical container 21 has a junction section 26 which includes a floor portion 29 having a side 27 connectable to the flange 3, and a ceiling portion 28 having a side 31 connectable to the flange 3 and an undersurface portion 32 complementary with the floor 29. In this way two halved portions 29 and 28 are united into the junction section 26. The floor 29 includes a recess 30 passed therethrough for accommodating the container 1, and the ceiling 28 includes a recess 33 complementary with the recess 30 when it is jointed to the floor 29. The two recesses 30 and 33 forms a single bore for accommodating the head portion of the container 1. The floor 29 and the ceiling 28 are provided with holes for the anchorage of fastening bolts. The provision of bore simplifies the assemblage of the two containers 1 and 21 without the necessity of adjusting the angle of fixture therebetween and the relative positions of the rotors 4 and 5. This is also advantageous in controlling the quality of the apparatus for mass-production.

FIG. 5 shows a preferred arrangement of the rotors 4, 5 and the screw 23. The $\alpha$ indicates an angle between one inner side wall and another inner side wall of the container 1, and the $\beta$ indicates an angle of decline between the plane including the axes (X) of both rotors 4 and 5 and the axis of the screw 23. The axis (X) of each 4, 5 joins a circular plane having a major diameter of the threads 24 at a point (P). Under this positional relationship the mass of material extruded by the rotors 4, 5 is smoothly extruded into the cylindrical container 21.

The size of the lower open end 17 of the intake port 2 can be determined as desired; preferably, the length of one side is two or three times as large as the major diameter of the threads 24 or larger, and the cross-sectional area thereof can be seven to ten times as large as that of the cylindrical container 21 or larger. In the illustrated embodiment the lower open end 17 takes a trapezoidal form, having a long side of 80 cm, a short side of 40 cm, the parallel long sides being 60 cm distant, and the area $a_1$ being 3600 cm². The screw 23 has an outside diameter of 18 cm, and the cylindrical container 21 has an inside diameter of 21 cm, and a cross-sectional area $a_2$ of 346 cm². Accordingly the ratio of the two areas $a_1/a_2 = 10.4$ According to the present invention the size of the intake port can be made large enough to allow a large volume of material to pass through without a clogging trouble occurring. In addition, a large mass of material can be smoothly extruded because of the fact that the spiral blades 15, 16 of the rotors 4 and 5 are progressively acute until they finally become 90°. Thus a large mass of material can be cut by the blades to such sizes that allows it to enter the second container.

What is claimed is:

1. A viscous liquids feeder for an extruding apparatus, the feeder comprising:
   a first container including a pair of rotors housed axially thereof, each of the rotors being shaped like a cone, having spiral blades on its peripheral surface, and being rotative in different directions, the first container including a material intake section in its upstream portion;
   a second container having a screw rotatably housed therein, the second container being provided horizontally with respect to the first container;
   a junction section provided in the second container at which the first container is joined thereto in such a manner that the interior of the first container communicates with that of the second container so as to allow the mixed material therein to transfer from the first container to the second container;
   wherein the axes of the pair of rotors form a given angle against the horizontal planes;
   wherein the material intake section includes a port having a cross-sectional area of at least seven times as large as that of the second container, said port being located at the root portion of the first container and being opened so as to be equal to an entire width of the first container; and
   wherein the spiral blades have angles increasing up to 90° progressively from immediately under the intake port toward the second container.

2. A feeder as defined in claim 1, wherein the axes of the rotors joins a circular plane having a major diameter of the threads of the screw in the second container.

3. A feeder as defined in claim 1, wherein the angle formed by a plane containing the axes of the rotors and a horizontal plane exceeds half of the angle formed by the opposite inner walls of the first container.

* * * * *